United States Patent

[11] 3,596,926

[72] Inventor Richard R. Randall
    427 Kirk Road, Decatur, Ga. 30030
[21] Appl. No. 851,198
[22] Filed Aug. 19, 1969
[45] Patented Aug. 3, 1971

[54] TRAILER HITCH COVER
    1 Claim, 3 Drawing Figs.
[52] U.S. Cl. .................................................. 280/507,
    220/38.5
[51] Int. Cl. .................................................. B60d 1/00,
    B60s 5/00
[50] Field of Search .......................................... 280/507,
    511; 220/38.5; 215/99

[56] References Cited
    UNITED STATES PATENTS
    2,714,912  8/1955  Gonnella ..................... 280/511 UX
    3,228,445  1/1966  Mayotte ...................... 280/507 X
    3,436,101  4/1969  Hanson ....................... 280/511
    FOREIGN PATENTS
    1,407,224  6/1965  France ........................ 280/507

Primary Examiner—Benjamin Hersh
Assistant Examiner—John P. Silverstrim
Attorney—Jones & Thomas ABSTRACT: A trailer hitch cover for protecting the ball portion of a trailer hitch which comprises a cup-shaped cover member having a soft absorbent material applied to its inside surface and carrying a lubricant. A mass of flexible material is applied to the inside surface of the opening of the cover member which can be wedged about the ball portion of the trailer hitch and which functions to maintain the cover member over the ball portion of the trailer hitch. A tether is connected to the cover member for connection to a trailer hitch or a towing vehicle to maintain the cover member in the general vicinity of the ball portion of the trailer hitch at all times, and a magnet is connected to the outside surface of the cover member for releasably connecting the cover member to the vehicle or the trailer hitch. A closure cap is connected to the cover member for closing the cover member when removed from the ball portion of the trailer hitch to keep dirt, etc., from entering the cover member and contaminating the lubricant therein.

Patented Aug. 3, 1971

3,596,926

INVENTOR
RICHARD R. RANDALL
BY Jones & Thomas
ATTORNEYS

TRAILER HITCH COVER

BACKGROUND OF THE INVENTION

A trailer hitch usually comprises a sphere or ball portion supported at its lower portion by an upright stem from a framework connected to a towing vehicle. The ball portion acts as the connecting member between the vehicle and the trailer and functions as a bearing surface as the trailer pivots with respect to the towing vehicle. When not in use, the ball portion of a trailer hitch is normally exposed at the rear of the vehicle in a position such that it gathers dirt and becomes rusty so that it eventually fails to provide a proper bearing surface for the trailer.

In the past, it has usually been necessary for the owner of a trailer to frequently clean and lubricate the ball portion of his trailer hitch before attaching a trailer thereto. In order to perform this function, the operator must maintain materials at hand to perform the cleaning function, such as an abrasive material and a lubricant, and spend time performing the cleaning and lubricating steps. Of course, this is inconvenient, troublesome and time consuming.

BRIEF DESCRIPTION OF THE INVENTION

Briefly described, the present invention comprises a trailer hitch cover for continuously protecting the ball portion of a trailer hitch when not is use. The cover carries a lubricant on its inside surface so that the lubricant is continuously applied to the ball portion of the trailer hitch and maintains the trailer hitch in an uncontaminated lubricated condition. The trailer hitch cover is constructed so that it will be continuously connected to the towing vehicle or the trailer hitch and always maintained in a position closely adjacent the ball portion of the trailer hitch.

Thus, it is an object of this invention to provide a trailer hitch cover for protecting and lubricating the ball portion of a trailer hitch.

Another object of this invention is to provide a trailer hitch cover that is maintained in a convenient location when a trailer is connected to the trailer hitch, and which can be conveniently and expediently connected to the ball portion of the trailer hitch when a trailer is disconnected from the trailer hitch.

Another object of this invention is to provide a trailer hitch cover that carries a lubricating substance that is automatically applied to the ball portion of a trailer hitch when the trailer hitch cover is inserted over the ball portion of a trailer hitch.

Another object of this invention is to provide a trailer hitch cover that is convenient to use, continuously maintains the ball portion of a trailer hitch in proper condition for immediate use, and which is inexpensive to manufacture.

Other objects, features and advantages of the present invention will become apparent upon reading the following specification, when taken in conjunction with the accompanying drawing.

DESCRIPTION OF THE PREFERRED EMBODIMENT

Figure 1:
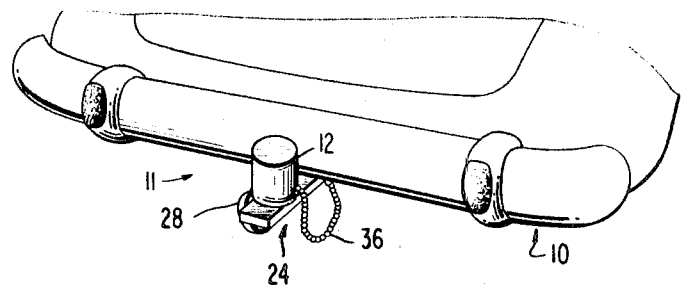
FIG. 1 is a detailed showing of the rear portion of a towing vehicle, a trailer hitch, and the trailer hitch cover applied to the trailer hitch.
Figure 2:
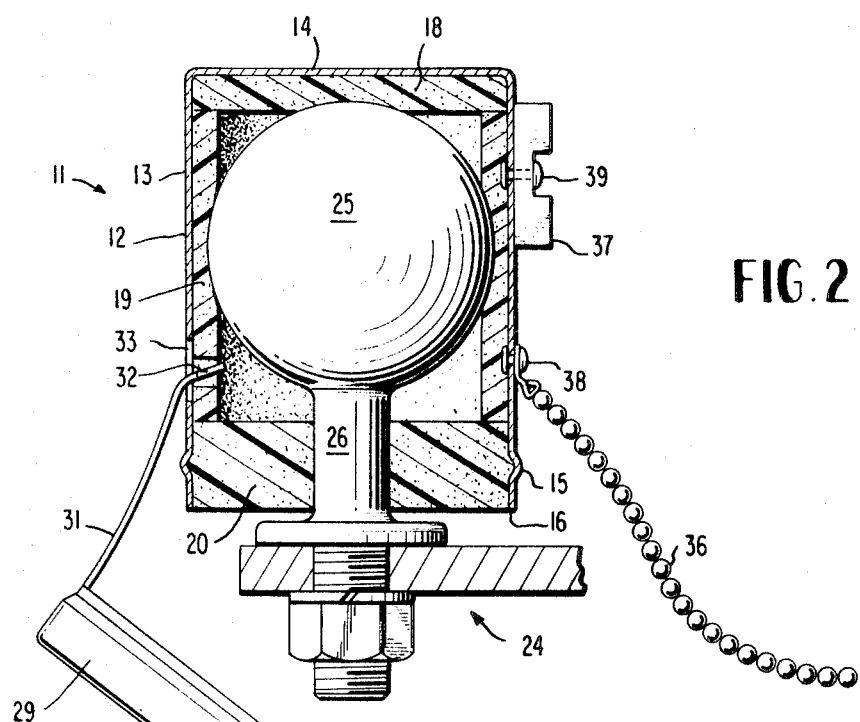
FIG. 2 is a side cross-sectional view of the trailer hitch cover as applied to the ball portion of a trailer hitch.
Figure 3:
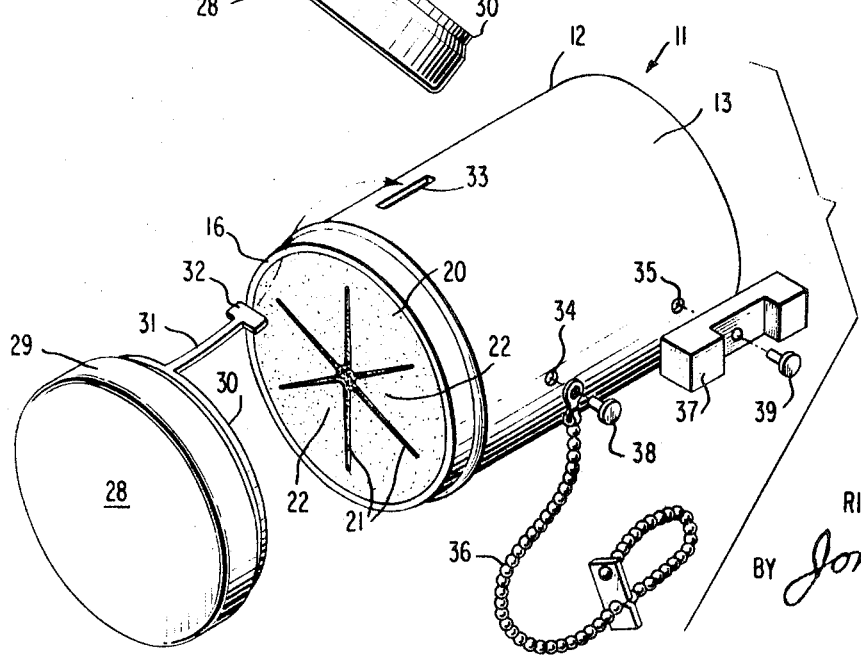
FIG. 3 is an exploded perspective view of the trailer hitch cover.

Referring now in more detail to the drawing, in which like numerals indicate like parts throughout the several views, FIG. 1 shows the rear portion of a vehicle 10 and the trailer hitch cover 11 inserted over the ball portion of a trailer hitch (hidden from view). As is best shown in FIGS. 2 and 3, trailer hitch cover 11 comprises a cup-shaped cover member 12 having an annular sidewall 13 and a disk-shaped top wall 14. Annular protrusion 15 extends about annular sidewall 13 at its open end 16. The inside surface of cover member 12 is covered with a soft absorbent material. The inside surface of disk-shaped top wall 14 is covered with a complementary shaped strip 18 of the soft absorbent material while the inside surface of annular sidewall 13 is covered with a conforming strip 19 of the material. Open end 16 of annular sidewall 13 has a strip 20 of similar material which extends across the opening of cover member 12 and substantially closes the open end 16. The strip of material 20 is also disk-shaped and attached at its periphery to the inside surface of annular sidewall 13. A series of intersecting slits 21 are cut into the strip of material 20 so that pie-shaped sections 22 are formed in the material. The configuration of pie-shaped sections 22 is such that they are flexible and will permit passage of items into cover member 12, as when cover member 12 is inserted over the ball of a trailer hitch.

The substance from which the strips of material 18, 19 and 20 are fabricated can be of virtually any absorbent flexible material, such as textile fabrics, sponge rubber, polyurethane foam, or other suitable materials. The material is chosen for its ability to absorb and maintain a lubricant suitable for coating the ball portion of a trailer hitch, and so that the material will not deteriorate.

As is shown in FIG. 2, trailer hitch 24 is connected to the rear portion of vehicle 10 and includes ball portion 25 supported by stem structure 26. The inside dimensions of cover member 12 are chosen so as to conform substantially with the outside dimensions of ball portion 25. Strip of material 20 at the open end 16 of cover member 12 is flexible due to its intersecting slits 21 so that its opening formed by slits 21 can be wedged down over the larger ball portion 25, and will generally bear against the stem structure 26 and function as a closure member and substantially close ball portion 25 inside the confines of cover member 12. Moreover, the flexibility of the strip of material 20 is such that cover member 12 will not be inadvertently vibrated from or knocked off ball portion 25 of the trailer hitch assembly 24. Cap 28 includes an annular side 29 that has a narrowing lip 30. Lip 30 is gauged to fit over annular protrusion 15 of annular sidewall 13 of cover member 12, so that when cap 28 is inserted over the open end 16 of cover member 12, lip 30 will snap over annular protrusion 15 and function to hold cap 28 in a closed relationship with cover member 12. The presence of the strip of material 20 immediately inside open end 16 together with the presence of cap 28 inserted over the end of cover member 12 virtually seals open end 16 of cover member 12.

Extension arm 31 is integrally connected to cap 28 and terminates in enlarged portion 32. Enlarged portion 32 is sized and shaped to be inserted through slot 33 defined in annular sidewall 13 of cover member 12. When enlarged portion 32 is inserted through slot 33, cap 28 and extension arm 31 are twisted so as to orient large portion 32 across slot 33 so that it cannot be removed from slot 33. This effectively connects cap 28 to cover member 12. Extension arm 31 is of a length sufficient to position cap 28 adjacent open end 16 of cover member 12 so that it can move into closed and opened relationship with respect to cover member 12.

A pair of openings 34 and 35 are defined in annular sidewall 13 of cover member 12 for the connection of tether 36 and magnet 37 to the outside surface of cover member 12. Tether 36 is connected through opening 34 to cover member 12 by means of a brad 38, or the like, and comprises a conventional ball chain. The free end of tether 36 is to be connected to the framework of a trailer hitch or to the framework of the towing vehicle. Magnet 37 is connected through opening 35 to cover member 12 by means of brad 39. Magnet 37 is rigidly connected to cover member 12 by a friction fit and functions to releasably connect cover member 12 to any metallic portion of the trailer hitch framework or the framework of the towing vehicle.

OPERATION

When a person desires to protect the ball portion of a trailer hitch from rust, corrosion and the collection of dirt, etc., he attaches the assembled trailer hitch cover 11 to his vehicle by connecting the loose end of tether 36 to the framework of the trailer hitch or to the framework of his towing vehicle. Cap 28 is then removed from the open end 16, and cover member 12 is then wedged down over the ball portion 25 of the trailer hitch structure 24. The lubricant carried by the inside strips of material 18 and 19 then contacts the surface of the ball portion 25, and maintains the ball portion in a lubricated, clean condition. The strip of material 20 at open end 16 substantially closes cover member 12 about the stem structure 26 of the trailer hitch structure and functions to hold cover member 12 over ball portion 25 so that vibrations, etc., will not function to bounce or otherwise remove cover member 12 from about ball portion 25. Cover member 12 thus will stay in place as shown in FIG. 2 until purposely removed from ball portion 25 by the operator.

When a trailer is to be connected to the trailer hitch, the operator merely lifts cover member 12 by ball portion 25 and places cover member 12 adjacent a metallic portion of the framework of the trailer hitch or of the framework of the towing vehicle so that magnet 37 is applied to and connected to this portion of the vehicle. In this manner, cover member 12 will be releasably connected to the vehicle. In the event that cover member 12 is inadvertently knocked away from its magnetic connection to the vehicle, tether 26 will function to catch cover member 12 so that it will not be lost.

When the operator removes trailer hitch cover 11 from about the ball portion 25, he usually will snap cap 28 about the open end of cover member 12, to keep dust, dirt, etc., from gaining access to the inside portion of cover member 12 and contaminating the lubricant therein. Of course, the strip of material 20 about open end 16 is such as to maintain the open end 16 substantially closed, even without having cap 28 snapped into closing relationship with cover member 12. Thus, if cover member 12 is inadvertently left open for a temporary period of time, the lubricant carried therein will not become contaminated or dried out.

Cover member 12 can be fabricated of various materials, including plastics or metals. Generally, the material from which cover member 12 is to be fabricated should be water impervious. The material from which strips of material 10, 19 and 20 are fabricated should be absorbent to retain the lubricant and soft to yield to the configuration of ball portion 25 of the trailer hitch assembly 24.

While this invention has been described in detail with particular reference to preferred embodiments thereof, it will be understood that variations and modifications can be effected within the spirit and scope of the invention as described hereinbefore and as defined in the appended claims.

I claim:

1. A device for protecting the ball portion of a trailer hitch comprising a cup-shaped cover member, a soft material applied to a major portion of the inside surface of said cover member, a lubricant carried by said soft material, a flexible closure member extending across the open end of said cover member and normally partially closing the open end of said cover member, a cap member pivotally connected to said cover member for closing the open end of said cover member, tether means connected at one of its ends to said cover member and for connection at its other end to a trailer hitch or the like, and a magnet member connected to said cover member for releasably connecting said cover member to a trailer hitch or the like.